United States Patent [19]

Burdick

[11] 4,045,122

[45] Aug. 30, 1977

[54] PROPELLER HUB REFLECTOR HOLDER

[76] Inventor: Robert C. Burdick, 251 Avenida Santa Barbara, La Habra, Calif. 90631

[21] Appl. No.: 683,100

[22] Filed: May 4, 1976

[51] Int. Cl.² .............................................. G02B 5/12
[52] U.S. Cl. ................................ 350/97; 240/7.1R; 280/414 R; 350/99
[58] Field of Search ................... 350/97, 98, 99, 107, 350/257; 240/7.55, 7.7, 8.12, 8.3, 22; 280/414 R, 423

[56] References Cited

U.S. PATENT DOCUMENTS

| 3,049,613 | 8/1962 | Baldwin | 350/257 |
| 3,080,581 | 3/1963 | Smihal | 240/7.5 |
| 3,639,036 | 2/1972 | Rosebach, Jr. | 350/97 |
| 3,696,238 | 10/1972 | Szymanski | 350/97 |
| 3,885,146 | 5/1975 | Whitley, Jr. | 280/414 R |

*Primary Examiner*—John K. Corbin
*Assistant Examiner*—B. W. delos Reyes
*Attorney, Agent, or Firm*—William W. Haefliger

[57] ABSTRACT

Traffic warning apparatus is mounted on a boat propeller hub flange, and comprises:

a. an elastomer holder in the form of a disc having a main body and a peripheral frusto-conical lip at one side of the body, the lip defining an axis and the lip tapering axially away from said main body of the disc to removably receive the hub flange periphery between the disc main body and the lip, and b. traffic warning means carried by the holder and openly facing axially away from the disc at the opposite side thereof.

5 Claims, 5 Drawing Figures

PROPELLER HUB REFLECTOR HOLDER

BACKGROUND OF THE INVENTION

This invention relates generally to traffic warning equipment, and more particularly concerns a means applicable to a boat element to warn following traffic.

Boats are commonly transported on trailers pulled by automobiles. While warning reflectors or lights may be carried at the rear of the trailers, a serious problem remains. For example, the aft end of the boat may considerably overhang the trailer, so that the risk of collision with a following vehicle is enhanced. Insofar as I am aware, no prior attempt to solve this problem embodies the assembly advantageous, simple and low-cost features of the present invention.

SUMMARY OF THE INVENTION

It is a primary object of the invention to provide a device attachable to a propeller hub flange in such manner as to provide maximum warning to following traffic, and also to be readily removable at such time as the boat is to be launched. In this regard, advantage is taken of the fact that the propeller hub is at a low elevation and rearwardmost location relative to the trailer carried boat, to be readily seen by a following motorist. Basically, the invention comprises:

a. an elastomer holder in the form of a disc having a main body and a peripheral frusto-conical lip at one side of the body, the lip defining an axis and the lip tapering axially away from said main body of the disc to removably receive the hub flange periphery between the disc main body and the lip, and b. traffic warning means carried by the holder and openly facing axially away from the disc at the opposite side thereof.

As will be seen, the warning means may comprise a light reflector the outer circular edge of which is removably receivable in an annular groove formed in a bead integral with the body, the reflector then being located in a central opening formed by the body and in alignment with an exhaust passage in the hub. Alternatively, the warning means may comprise an electric lamp mounted on a carrier whose outer edge is received in the recess as referred to.

These and other objects and advantages of the invention, as well as the details of an illustrative embodiment, will be more fully understood from the following description and drawings, in which:

DRAWING DESCRIPTION

DETAILED DESCRIPTION

Figure 1:
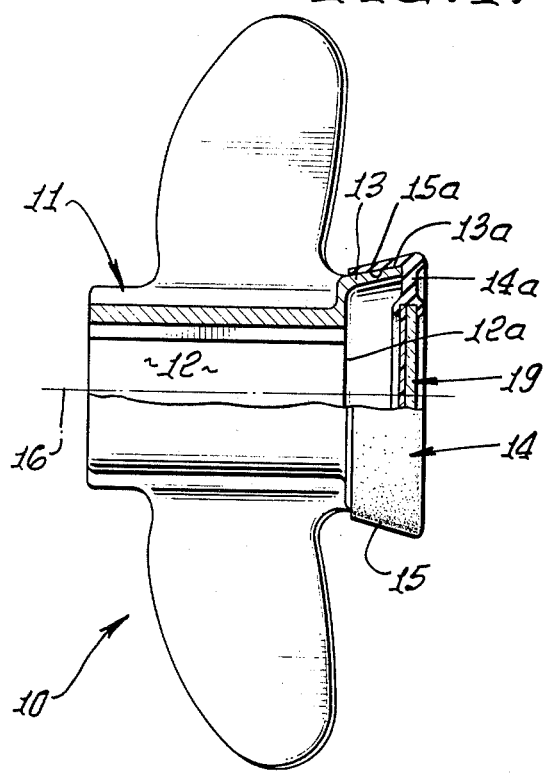
FIG. 1 is a side elevation, taken in section.
Figure 3:
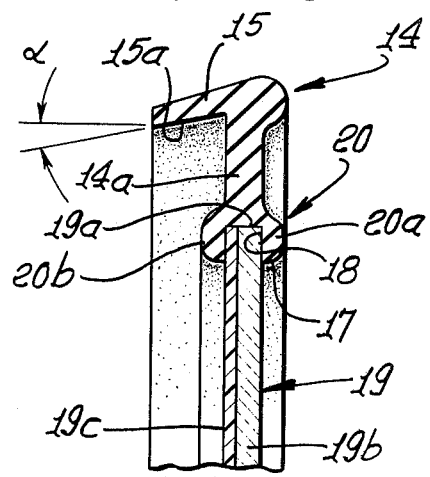
FIG. 3 is an enlarged fragmentary section on lines 3—3 of FIG. 2.
Figure 2:
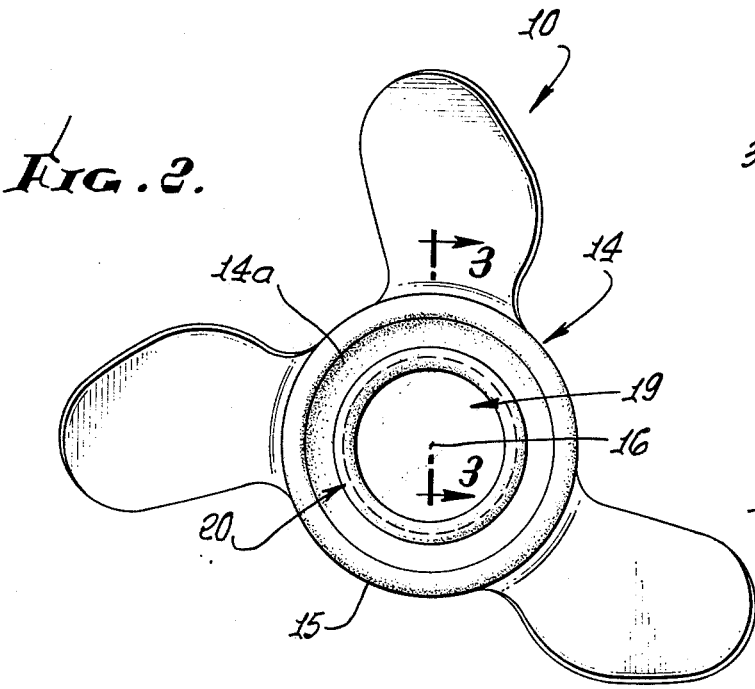
FIG. 2 is a frontal elevation, on lines 2—2 of FIG. 1.

In FIGS. 1 and 2 a boat propeller 10 has a hub 11 defining a central exhaust passage 12. The hub also defines a coaxial rearward flange 13 flaring rearwardly and outwardly, as shown, radially outwardly of the rearward terminal 12a of the exhaust passage.

In accordance with the invention, an elastomer holder 14 is provided to have the form of an upright disc with a main annular body 14a and a peripheral lip 15 tapering relatively inwardly and forwardly at the left side of the body. The annular lip and the remainder of the holder define a central axis 16 coaxial with the flange 13. The taper angle α of the lip inner surface 15a approximately matches the flare angle of the flange outer surface 13a so that the flexible lip is removably receivable onto the hub flange 13, the latter then received between the disc main body and the lip in an axial direction. Accordingly, the holder is firmly anchored on the flange, and will remain thereon as for example during the time that the boat is pulled along on a trailer with the propeller exposed to following highway traffic.

It will be noted that the disc main body 14a defines a central opening 17 bounded by an annular body bead or enlargement 20 into which an annular groove 18 is sunk, radially. A traffic warning means such as light reflector 19 is carried by the holder, as for example within the central opening 17. The reflector outer edge 19a is typically removably received in the groove, as by axially resiliently deflecting one of the bead lips 20a and 20b to allow admittance of the reflector edge into the groove.

The reflector 19 is disc shaped, and may include a panel 19c to which reflection material 19b may be laminated, to face rearwardly toward following traffic.

Accordingly, a simple reflector holder is provided, it can be readily molded to removably receive the reflector, and the holder is readily attached onto the propeller hub flange, for protection and warning purposes. Before the boat is launched, the holder may be easily readily removed.

Figure 4:
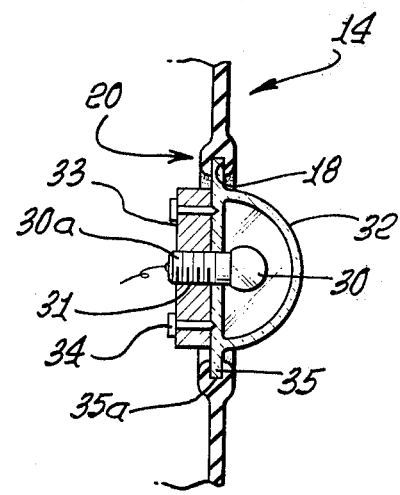
FIG. 4 is a fragmentary side elevation showing a modification.

In FIG. 4, the holder 14 remains the same as described above, having bead 20 and recess 18 therein. The traffic warning means here comprises an electric lamp 30 appropriately carried within a translucent housing 32, which may be red. The lamp may have its shank 30a received in a plate 33 removably attached at 34 to carrier 35. The carrier outer edge 35a is received within the groove 18 in the same manner as discussed above, for the reflector.

Figure 5:
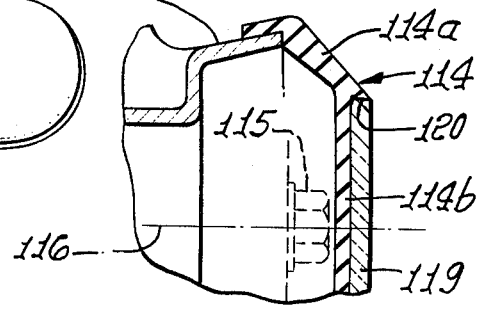
FIG. 5 is a fragmentary view of a modification.

In FIG. 5, the frusto-conical body 114a of the modified holder 114 is tapered axially away from the propeller hub flange 113, to allow the body disc portion 114b to extend rearwardly of a hub nut 115 at axis 116. A disc shaped reflector 119 is received in a central recess 120 formed by the body portion 114b, to face rearwardly toward on-coming traffic.

I claim:

1. In combination with a boat propeller hub having a frusto-conical flange the outer surface of which flares axially rearwardly toward the flange terminal, the combination comprising a. an elastomer holder in the form of a disc having a main body and a peripheral frusto-conical lip at one side of the body, the lip defining an axis and the lip tapering axially away from said main body of the disc to removably receive the hub flange periphery between the disc main body and the lip, and b. a light reflector carried by the main body of the holder and openly facing axially rearwardly away from the disc at the opposite side thereof, and to extend across the main extent of the area rearwardly subtended by the disc, c. the hub and flange both being annular and the hub forming a central exhaust passage which is blocked by the holder and reflector.

2. The combination of claim 1 wherein the disc main body defines an annular groove removably receiving the reflector outer edge, the disc forming a central through opening when the reflector is removed.

3. The combination of claim 2 wherein the disc main body is annular.

4. The combination of claim 3 wherein the disc main body defines an annular bead bounding said central opening, said annular groove sunk radially into the bead.

5. The combination of claim 1 including a propeller carried by the hub forwardly of said holder lip and forwardly of said flange over which the lip is removably received.